United States Patent [19]

Thomson

[11] 4,310,067

[45] Jan. 12, 1982

[54] OPTIMIZED DIESEL ENGINE EXHAUST SILENCER

[75] Inventor: Donald C. Thomson, Annapolis, Md.

[73] Assignee: The United States of America as represented by the Secretary of the Navy, Washington, D.C.

[21] Appl. No.: 779,329

[22] Filed: Nov. 27, 1968

[51] Int. Cl.³ ............................. F01N 1/00; F01N 7/08
[52] U.S. Cl. .................................. 181/228; 181/235; 181/253; 181/255; 181/260; 181/265; 181/268; 181/272
[58] Field of Search ................... 181/47.1, 52, 64.2, 181/53, 56, 35.2, 39, 44, 45, 228, 221, 235, 253, 255, 254, 260, 265, 268, 272; 55/DIG. 30, 308

[56] References Cited

U.S. PATENT DOCUMENTS

| 724,124 | 3/1903 | Perkins | 181/52 |
| 2,488,563 | 11/1949 | Sills | 181/45 UX |
| 2,692,653 | 10/1954 | Diez | 181/52 |

Primary Examiner—L. T. Hix
Attorney, Agent, or Firm—R. F. Beers; L. A. Marsh

[57] ABSTRACT

An exhaust silencer system for piston type internal combustion engines having a wet-exhaust, having a muffler and a muffler bypass which contains water at slow and moderate engine speeds, the water being expelled by the exhaust gas pressure at high engine speed, opening said bypass to the flow of exhaust gases thus reducing the exhaust back pressure occurring in the muffler.

4 Claims, 2 Drawing Figures

OPTIMIZED DIESEL ENGINE EXHAUST SILENCER

The invention described herein may be manufactured and used by or for the Government of the United States of America for governmental purposes without the payment of any royalties thereon or therefor.

BACKGROUND OF THE INVENTION

This invention relates generally to exhaust silencer systems and more particularly to a system having a muffler and a muffler bypass, the flow through which may be automatically varied by means of water filling the bypass at low and moderate engine speeds, the water being expelled and thus opening the bypass to the flow of exhaust gases at high engine speeds thus eliminating or reducing back pressure on the engine.

In a piston type internal combustion engine, exhaust gases are discharged from the engine cylinders, one after another, in a continuous series of loud explosions. The frequency and noise level of the explosions varies more or less in accordance with the engine speed and the load. Conventional mufflers, to be effective in eliminating or reducing the noise, necessarily but undesirably increase the back pressure on the engine resulting in impairment of the performance of the engine, particularly at high speeds where there is a high rate of gas flow through the muffler. These conventional mufflers cannot adjust themselves to the different operating conditions of the engine and effect a compromise between the desired degree of silencing and the objectionably high back pressure condition. It is therefore desirable to design an exhaust silencer system which gives a high degree of noise reduction and low back pressure at the moderate engine speeds generally used, but have means for automatically reducing the higher pressure occurring at high speeds.

Prior art systems generally have a muffler and a bypass or muffler cut-out valve which may be manually opened when exhaust back pressure exceeds a certain limit. These manually controlled bypass valves are subject to corrosion from the corrosion by-products in the exhaust gases and are subject to frequent failure. Furthermore, neglecting to manually operate the bypass valves results in degradation of engine performance.

SUMMARY

The present invention overcomes the aforementioned disadvantages of the prior art by providing an exhaust silencer system having a muffler through which the exhaust gases normally pass when the engine is operated at slow to moderate speeds and a bypass of at least a portion of the muffler which automatically opens when the exhaust gas flow through the muffler exceeds its designed flow capacity. The muffler bypass is in the form of a manometer or U-tube type water trap which is filled with water injected for cooling purposes at the engine manifold or exhaust pipe from auxiliary means. This water now entrained in the exhaust gases collects in the lower portions of the water trap bypass, filling it, and thus eliminating flow therethrough at slow to moderate engine speeds. When the engine speed is increased whereby flow of exhaust gases exceeds the flow capacity of the muffler, the resulting back pressure blows or otherwise forces out the water captured in the U-tube shaped water trap bypass. The exhaust gases are thus permitted to flow less restricted to the atmosphere directly to the tailpipe or through a less restricting path in the muffler itself.

Accordingly, it is the principal object of this invention to provide an exhaust silencer system having a muffler and a bypass which is automatically adjustable to the operating condition of the engine so as to function more effectively under varying speed and load conditions.

Another object of the invention is to provide an exhaust silencing system which is effective in silencing the exhaust noise level without imposing objectionable back pressure on the engine.

Still another object of the invention is to provide an exhaust silencing system which produces effective noise silencing at slow to moderate engine speeds and which reduces excessive back pressure at high engine speeds.

Other objects and features of the invention will become apparent to those skilled in the art upon reference to the accompanying specification, claims and drawings in which:

DESCRIPTION OF THE PREFERRED EMBODIMENT

Figure 1:
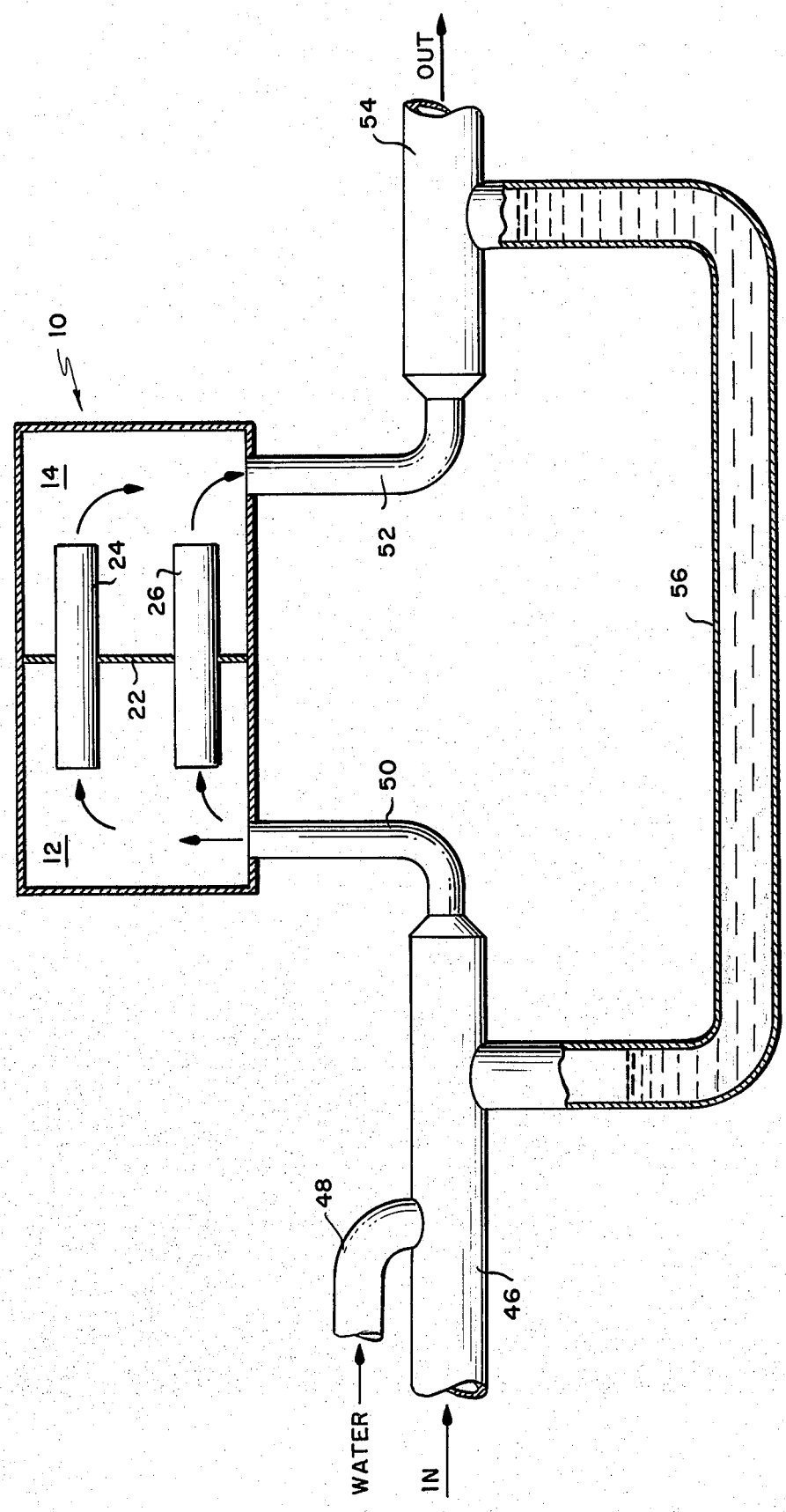
FIG. 1 is a cut-away view of a muffler and a parallel bypass which bypasses the entire muffler.

Referring now to FIG. 1, there is shown a muffler 10 having two chambers 12 and 14. The two chambers are separated by bulkhead 22 having tubes 24 and 26 mounted in apertures therein, thus providing flow restricting conduit means between the chambers.

Figure 2:
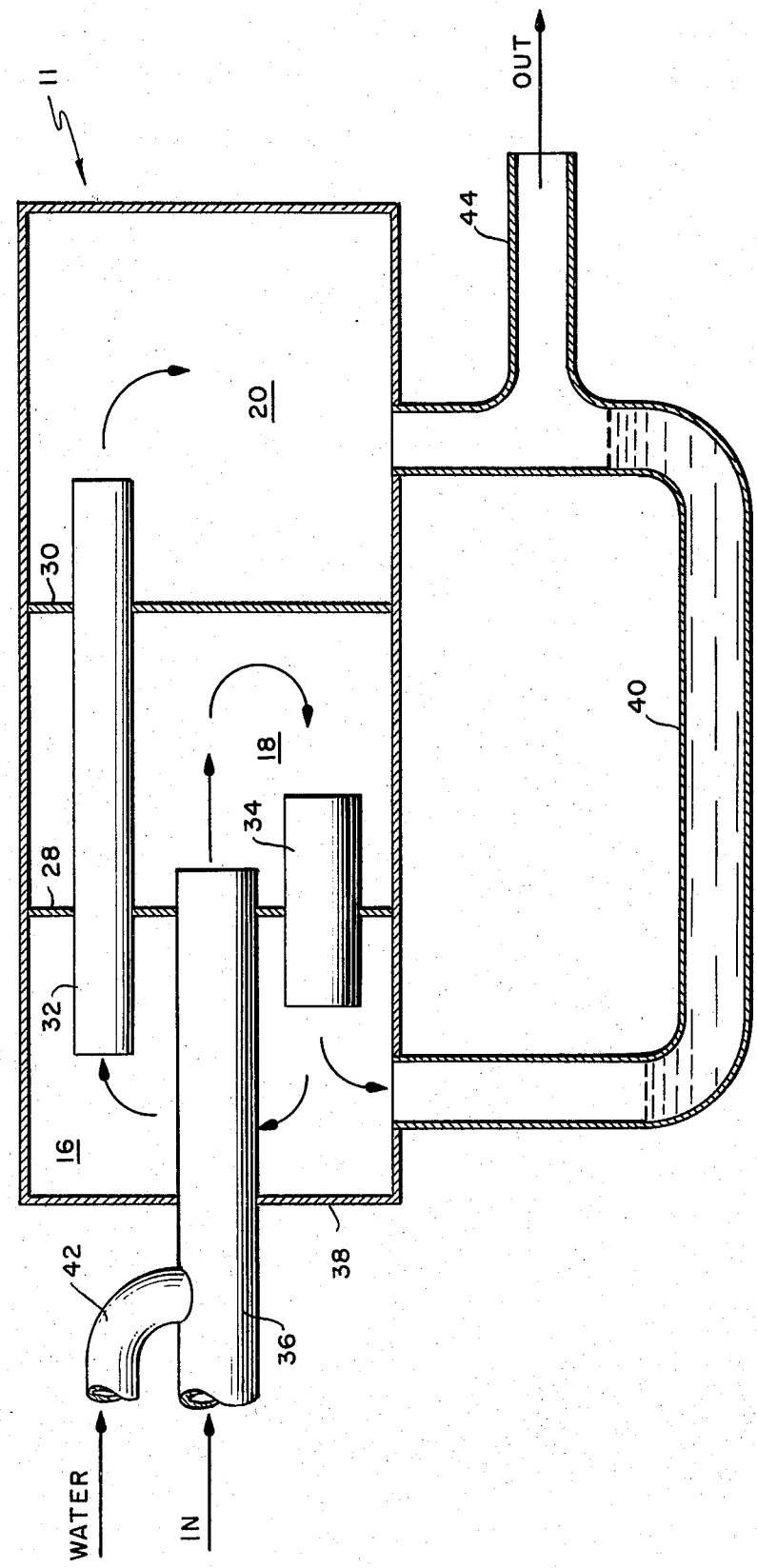
FIG. 2 is a cut-away view of an exhaust system having a muffler and a parallel flow path which bypasses a portion of the muffler.

The muffler 11 of FIG. 2 has three chambers separated by bulkheads 28 and 30. A flow restricting tube 32 mounted through apertures in the bulkheads 28 and 30 fluidly connect the first chamber 16 and the third chamber 20. Another flow restricting tube 34 is mounted in bulkhead 28 fluidly connecting chamber 16 and the second chamber 18.

Exhaust pipe 36 for carrying exhaust gases from an engine (not shown) is mounted in and passes through an aperture in wall 38 of the muffler and is also mounted in and passes through bulkhead 28 to permit the flow of exhaust gases directly into the second chamber 18.

Interconnecting the first chamber 16 with the third chamber 20 of the muffler 11 (FIG. 2) is an external water trap 40 in the form of a U-tube manometer which is shown containing water. The water for filling the water trap 40 is obtained from the cooling water injected into the exhaust pipe 36 at the connection 42 creating what is known as a wet-exhaust system. Tail pipe 44 is Tee-connected to the exit portion of water trap 40 which is further connected to the third chamber 20 of muffler 11, where all exhaust gases will be emitted from the system.

Referring now to FIG. 1 where the details of the muffler 10 have been previously described, there is shown an exhaust pipe 46 having a Tee-connection 48 for injecting exhaust cooling water into said exhaust pipe. Exhaust pipe 46 is interconnected with the muffler 10 via an input conduit 50. Output conduit 52 connects from muffler 10 to tail pipe 54 for the emission of exhaust gases flowing through the muffler. Interconnecting exhaust pipe 46 and tail pipe 54 is water trap 56 in the form of a U-tube and shown containing water.

DESCRIPTION OF THE OPERATION

The exhaust silencer system according to this invention is generally applied to the piston type internal combustion engines having a wet exhaust. The reference to a wet exhaust implies that the entire exhaust system is cooled by simply injecting water into the exhaust gases at some point along the exhaust pipe or by injecting cooling water from water jacketing into the exhaust gases further along the line. It is therefore understood that water is available in the exhaust system for filling the water trap 56 or 40 to cause the exhaust gases to flow through the muffler 10 or 11 respectively.

The water thus filling the water trap resists being forced out of its manometer or U-shaped tube by virtue of the pressure head exerted in the vertical portions of the water trap. Until the exhaust pressure of the engine exceeds the flow limitations of the muffler and the pressure head of the water trap, the water will remain to preclude flow thru the water trap. At high engine speeds, where the exhaust gas pressure exceeds the flow capacity of the muffler 10 of FIG. 1, the water in the trap will be blown clear and out the tail pipe 54 thus permitting exhaust gases in the exhaust pipe 46 to flow both through the muffler 10 and the water trap 56. Back pressure is thus relieved. Unfortunately, of course, muffler 10 will become rather ineffective and exhaust silencing will be minimum in the case of the embodiment shown in FIG. 1.

In the case of the embodiment of FIG. 2, at slow engine speeds, the water trap is completely filled with the water existing in the wet exhaust and the exhaust gases are thus forced to pass through the small tube 32 fluidly connecting the first chamber 16 and the third chamber 20 and then sent to the tail pipe. The tube 32 is sized long in length and small in diameter to best attenuate the low noise frequencies existing at low volume rates of exhaust gas flow.

At higher volume rates of flow, that is, at higher engine RPM, the resistance to flow of the small tube 32 (in inches of water) exceeds the resistance of the pressure head existing in the water trap 40. Thus the water trap 40 will be blown clear. Therefore, the exhaust gases being delivered directly into the second chamber 18 and thence flowing into the first chamber 16 will split direction and pass through the water trap 40 as well as passing through the small tube 32 into the third chamber 20 where they will meet and be expelled from the tail pipe 44. This latter arrangement provides greater exhaust silencing than that the embodiment of FIG. 1 in that the first chamber 16 and second chamber 18 of the muffler 11 provide substantial attenuation of exhaust noise.

While the theory of the operation of tube and chamber mufflers is perhaps well known, a better understanding of this invention will be had by reference to the theory. The attenuation of an expansion chamber silencer is a function of its length and expansion ratio, that is the ratio of cross-sectional area of the silencer to the tube. It has been found that each doubling of the expansion ratio provides an improvement in attenuation of approximately 6 dB. Therefore, by sizing the tube connecting the first chamber 16 and the third chamber 20 to a cross-sectional area of one-half the exhaust inlet pipe 36 size, an improvement in the attenuation of approximately 12 dB is achieved at slow engine speeds. When referring to FIG. 2, it is to be noted that exhaust silencing at high speeds is provided when the water trap 40 is flown clear by virtue of the expansion ratio provided in the first chamber 16 and a second chamber 18.

In the case of the embodiment of FIG. 1, about one-half the flow of the exhaust gases will be thru the muffler 10 at high engine speeds when the water trap 56 is blown clear of water and at least some attenuation of exhaust noise will be provided, however, not as much as is provided in the embodiment of FIG. 2.

It is to be understood that the invention is not limited to the exact detail of the construction shown and described, for obvious modifications will occur to persons skilled in the art.

What is claimed is:

1. An exhaust silencer system for piston type internal combustion engines comprising:
   a fluid conduit comprising in tandem an exhaust pipe, a muffler, and a tail pipe; and
   a bypass tube capable of trapping a liquid under the force of gravity, fluidly coupled to said fluid conduit to bypass at least a portion of said muffler, whereby at low exhaust pressure the liquid is held in said bypass, and at a predetermined higher exhaust pressure the water is expelled.

2. The exhaust silencer system of claim 1 wherein said bypass tube interconnects with said exhaust pipe and said tail pipe thereby selectively bypassing the entire muffler.

3. The exhaust silencer system of claim 1 wherein said muffler comprises three expansion chambers and said bypass tube interconnects with a first chamber and a third chamber.

4. The exhaust silencer system of claim 1 further comprising a water inlet connection to said exhaust pipe.

* * * * *